Patented Sept. 5, 1950

2,521,318

UNITED STATES PATENT OFFICE 2,521,318

DDT SUSPENSION

Herbert C. Wohlers and Thomas C. Davis, St. Louis, Mich., assignors to Michigan Chemical Corporation, St. Louis, Mich., a corporation of Michigan No Drawing. Application March 27, 1947, Serial No. 737,737

8 Claims. (Cl. 167—43)

The present invention relates to the art of preparing parasiticidal compositions and to a new composition of matter. It is more particularly concerned with a method for the preparation of a parasiticidal composition containing 2,2-bis-(para-chlorophenyl)-1,1,1-trichloroethane, hereinafter referred to as "DDT," as the major essential ingredient, and with the particular composition thus produced.

An important consideration in the selection of a parasiticidal composition is that it must have physical characteristics which allow safe handling in use, without any cumulative effects from frequent exposure thereto. Another consideration, of secondary importance only to the factor of human safety, is that a parasiticidal composition should be capable of effective application to the host plant or animal in quantities which are both readily available and lethal to the parasite, in a physical state which is not injurious to the plant or animal treated.

The problems of application are not solved with reference to DDT by employment of a solution of DDT in volatile organic solvents such as kerosene or xylene, as such compositions appear to have an inherent deleterious effect upon foliage and plant life in general as well as being absorbed readily through the human skin.

Water usually provides an excellent solvent medium for active parasiticidal ingredients, being inexpensive and generally noninjurious to plant life, but its use is unfortunately limited by the fact that DDT is not soluble therein.

The addition of a surface active agent to finely divided DDT does not provide a satisfactory water suspension thereof by any ordinary means, as DDT is a waxy solid, capable of subdivision only with great difficulty, and generally requires the incorporation of an inert diluent such as kaolin to facilitate the grinding operation. While more or less satisfactory sprays have been obtained with wettable-DDT and solid inert diluent combinations, appropriate equipment in the forrm of an agitated spray tank is usually necessary, and contact parasiticidal effectiveness of the DDT may be reduced by the masking effect of certain solid inert diluents.

To avoid this masking effect, suspensions of DDT without a solid inert diluent have been prepared by complex procedures involving solution of DDT in a water-miscible solvent, such as a water-miscible ketone or alcohol, and atomizing a minor proportion of this solution in a larger proportion of water by a double-nozzled converging spray device. Such attempts have not met with any measure of success and are generally inapplicable.

It has, of course, been recognized that DDT could be advantageously dispensed commercially in a form which would suspend readily in water upon dilution, a manipulation which can be conducted with facility by an individual consumer. Various emulsions of DDT have been prepared, but these have been generally unstable compositions which "break" upon standing for any appreciable length of time. A typical emulsion as previously prepared and dispensed might include 25 parts of DDT in 50 parts of toluene and 25 parts of methylcyclohexanol, in about 100 parts of a fatty alcohol sulfonate and 200 parts of water. Such a concentrate gellifies in the cold, and yields on dilution with water an emulsion of "DDT-in-oil solution" droplets dispersed throughout the water. This type of emulsion, though satisfactory for some applications, is phytocidal wherever the "DDT-in-oil solution" droplets contact the plant foliage, and is little more satisfactory than an ordinary solution of DDT in oil.

It is an object of the present invention to provide a method for the preparation of a substantially non-settling, non-caking concentrate, comprising DDT, water, and an oil, which is capable of ready dilution in the hands of an inexperienced individual consumer, and which will, upon dilution with water, yield a stable suspension of solid DDT in water, providing a safe and ready form for application to plant life.

A further object of the invention is the provision of a such concentrate as above-described.

An additional object of the invention is to provide a DDT composition which has the advantage of depositing an adherent residue not detracting from the appearance of ornamental and other plants.

Other objects of the invention will become apparent from the following description.

A general formulation for a concentrate prepared in accordance with our invention comprises the following, percentages being of total weight of the finished concentrate:

|  | Per cent | Per cent |
|---|---|---|
| DDT | 20-50 | 35-45 |
| DDT solvent oil | 3-25 | 8-12 |
| Refined white oil | 0-15 | 8-12 |
| Emulsifier | 1-10 | 1-6 |
| Water | 25-69 | 48-30 |

Total being 100 per cent.

In general, and with particular reference to concentrates containing less than about 35 per cent of DDT, the lower the percentage of DDT in the finished product, the higher should be the oil content. In all instances, however, the quantity of oil used is less than that required to dissolve at room temperature the amount of DDT present. The lower limit of 25 per cent of water in the concentrate is critical. As herein used, the term "DDT solvent oil" means an organic, substantially water-immiscible liquid, boiling above 100 degrees centigrade, showing high solubility for DDT, particularly above about 20 grams of DDT per 100 grams of organic liquid at room temperature, and is preferably an aromatic hydrocarbon showing high solubility for DDT.

The method of our invention comprises melting together a mixture of about 200 parts of DDT, up to about 100 parts of an alkylated aromatic base oil, such as polymethylated naphthalenes, and up to about 30 parts of an emulsifier. This molten oil mixture is then poured into between about 150 and about 200 parts of boiling water with vigorous agitation. After colloidising while hot, the final mixture is quickly cooled. In this manner there is produced a water-dispersible parasiticidal composition of solid DDT particles which has been found safe for application to the foliage of living plants to which DDT is per se non-injurious, and to be non-settling, non-caking, and readily diluted with water to form a stable suspension of solid particles of DDT in water.

The DDT solvent oil employed in the above-described composition may be a mixture of alkylated aromatic oils such as polymethylated naphthalenes, sesame oil, cyclohexanone, et cetera, in about 20 per cent by weight of the concentrate when the DDT is present in the usual concentration of 40 per cent. If desired, this oil may be present in as small a proportion as about 6 per cent of the total concentrate, the remaining 14 per cent consisting of a refined kerosene insecticidal base oil, such as refined white oil. Insufficient oil to cause solution of DDT at room temperature therein is employed and, therefore, a suspension of solid DDT particles is obtained after cooling the colloidised mixture.

Various types of emulsifiers may be employed in the composition, usually not less than about 1 per cent by weight, and particularly efficient agents have been found in alkylphenoxy polyethoxyethanols, polyoxyalkylene derivatives of hexitol anhydride partial long-chain fatty acid esters, other partial ethers and partial esters of aliphatic polyhydroxide substances, and mixtures of the same, especially 50:50 mixtures of hexitol anhydride fatty acid esters and alkylene oxide addition products thereof. These are all non-ionic ether-type emulsifiers, containing ether groups as the hydrophilic part of the molecule, and, if hydroxyl groups are also present, at least one ether group per hydroxyl group. Many other emulsifiers will be found suitable for employment in the composition, and the exact agent employed for this purpose is of little concern, as long as the desired suspension be obtained.

The DDT, oil, and dispersing agent are melted together by heating at a temperature between about 85 and 104 degrees centigrade, depending somewhat upon the purity of the DDT. The molten mixture is thoroughly agitated to insure satisfactory distribution of all components, and is then gradually added to the water at a temperature above about 85 degrees centigrade, preferably at its boiling point, with vigorous agitation to form an emulsion of molten DDT in water. Either addition of the molten mixture to the water or the reverse may be employed, with no advantages being apparent when operating one way or the other. The emulsion is then colloidised and cooled to produce a suspension of solid DDT in water by conventional procedure, such as by stirring in a container surrounded by a water-cooling bath.

It is of particular importance to note that the emulsion is of the oil-in-water type, and that while a molten mixture of DDT, oil, and emulsifying agent when added to the hot water first forms an emulsion, the resulting product after colloidising and cooling is an actual dispersion of solid particles of DDT in water. The final product does not contain DDT dissolved in oil, inasmuch as the amount of oil employed is insufficient to dissolve the DDT at room temperature. The use of the oil results in the production of a dispersion which is non-caking even on long standing. In use, the amount of oil is not sufficient to cause plant injury and may increase the effectiveness of the DDT.

The following examples are given to illustrate our invention, but are in no way to be construed as limiting. The parts given are by weight.

*Example 1*

A mixture of 200 parts of DDT, 75 parts of alkylated aromatic oils, and 15 parts of a polyethylene oxide ester of a higher aliphatic acid was heated to a temperature of about 95 degrees centigrade and stirred to mix the components. The mixture was gradually added to 110 parts of boiling water with stirring, and then passed while hot through a colloid mill and then quickly cooled. The resultant product was a white colloidal dispersion having the consistency of a heavy cream, which suspended readily in water upon dilution.

*Example 2*

A mixture of 200 parts of DDT, 100 parts of polymethylated naphthalenes, 20 parts of hexitol anhydride partial fatty acid ester alkylene oxide addition products, and 20 parts of hexitol anhydride partial fatty acid esters was heated to a temperature of 95 degrees centigrade with stirring. The mixture was gradually added to 150 parts of boiling water with stirring, and the mixture passed, while hot, through a colloid mill and then quickly cooled. The product was a white colloidal dispersion having about the consistency of heavy dairy cream, which upon dilution produced an effective spray for application to plant life.

*Example 3*

Another embodiment of the invention found satisfactory according to the preceding objects is as follows:

200 parts DDT
100 parts {0–70 parts refined white oil
{30–100 parts alkylated aromatic oil
5–35 parts emulsifier
150–200 parts water.

With the above formulation, the emulsifying agent is preferably an alkylphenoxy polyethoxy ethanol, and the quantity of emulsifier preferably at least 20 parts when higher proportions of refined white oil are employed.

Dilutions of the concentrate have been found perfectly safe for application to plant foliage, and spray residues thereof are characterised by the small amount of visible white solid which is of advantage on surfaces where unsightly residues are objectionable. Even after concentrates have been allowed to stand for a considerable time, no caking of the solid material is apparent, and a simple inversion of the container results in a suspension of solid DDT.

As certain variations in the exact manner of operation and proportions of ingredients may be made without departing from the spirit or scope of the invention, it is to be understood that we limit ourselves only as defined in the appended claims, in which the parts or percentages are by weight.

We claim:

1. In a method for the preparation of a water-dispersible parasiticidal concentrate, the steps which include: melting DDT in quantity at least about 37 percent by weight of the total concentrate, an emulsifying agent which is a non-ionic ether-type agent, containing ether groups as the hydrophylic part of the molecule, and, if hydroxyl groups are present, at least one ether group per hydroxyl group, and oil in a quantity not less than about 37 percent by weight of the DDT, at least a portion of said oil being a DDT solvent oil, the combined DDT and oil representing from about 50 to 75 percent by weight of the total concentrate, mixing the liquid mixture with agitation with from about 25 to 50 percent of water by weight of the total concentrate, said water being at a temperature above about 90 degrees centigrade, and colloidizing and cooling the emulsion thus produced to form a suspension of solid DDT particles.

2. The method as claimed in claim 1, wherein the water is at its boiling point.

3. The method as claimed in claim 1, wherein the DDT solvent oil is an aromatic hydrocarbon.

4. The method according to claim 1, where a DDT solvent oil is added in amount between about 3 and 25 percent in the total concentrate, sufficient refined white oil being added therewith to make the total concentration of oil in the final concentrate between about 37 and 50 percent of the DDT present.

5. The method according to claim 1, wherein the emulsifying agent is added in amount between about 1 and about 10 percent in the total concentrate.

6. The method according to claim 1, where the DDT is present in amount between about 37 and 50 percent in the total concentrate.

7. A water-dispersible concentrate containing from about 37 to 50 percent of solid colloidized DDT particles, from about 1 to 10 percent of an emulsifying agent which is a non-ionic ether-type agent, containing ether groups as the hydrophylic part of the molecule, and, if hydroxyl groups are present, at least one ether group per hydroxyl group, from about 3 to 25 percent by weight of the total concentrate of a DDT solvent oil, sufficient refined white oil being present to make a total concentration of oil between about 37 and 50 percent by weight of the DDT, and from about 25 to about 50 percent of water, the combined DDT and oil representing from about 50 to 75 percent by weight of the total concentrate.

8. A composition according to claim 7, wherein the composition comprises about 200 parts of DDT, from about 0 to 70 parts of refined white oil, and from about 30 to 100 parts of alkylated aromatic oil, the total parts of oil being about 100, between about 5 and 35 parts of the emulsifier, and between about 150 and 200 parts of water.

HERBERT C. WOHLERS.
THOMAS C. DAVIS.

REFERENCES CITED

The following references are of record in the file of this patent:

UNITED STATES PATENTS

| Number | Name | Date |
| --- | --- | --- |
| 2,397,802 | Muller | Apr. 2, 1946 |
| 2,420,295 | Biehn | May 13, 1947 |
| 2,447,475 | Kaberg | Aug. 17, 1948 |

FOREIGN PATENTS

| Number | Country | Date |
| --- | --- | --- |
| 547,871 | Great Britain | Sept. 15, 1942 |

OTHER REFERENCES

J. Am. Pharmaceutical Assn., Prct. Pharm. Ed., Oct. 1945, pages 260–265 (page 263 especially pertinent).

Jones: "DDT-Xylene Emulsions," J. Econ. Entomology, Dec. 1946, pages 735–740.